N. C. LANE.
PIPE COUPLING.
APPLICATION FILED JUNE 18, 1912.
1,062,015.
Patented May 20, 1913.
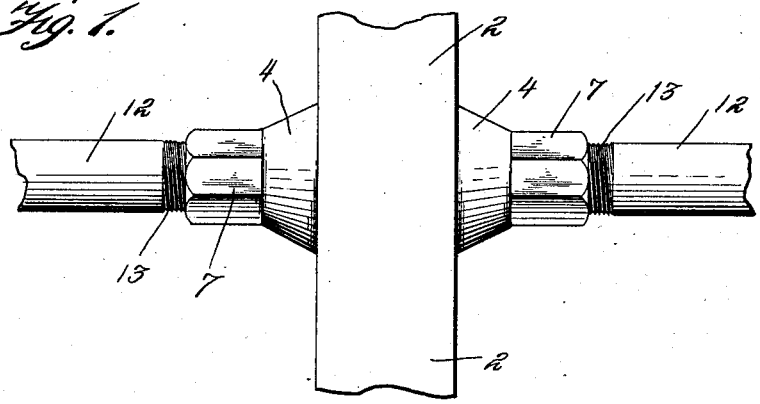
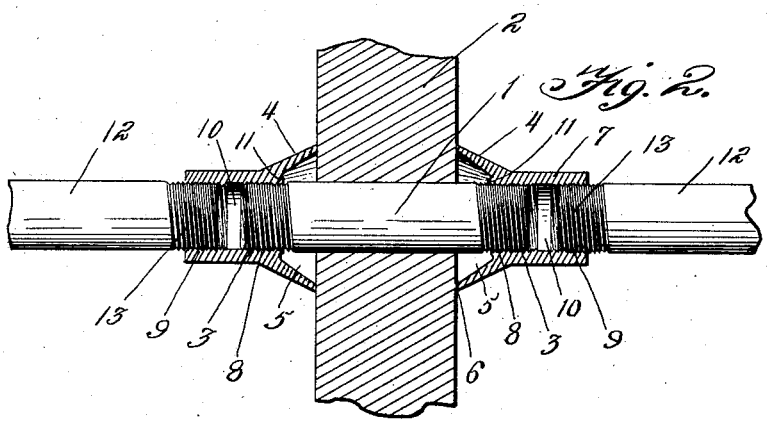
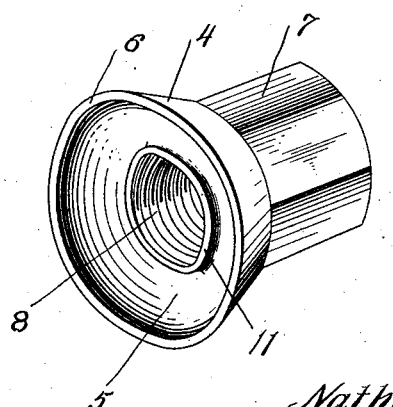
WITNESSES
INVENTOR:
Nathan C. Lane,
Attorney.

UNITED STATES PATENT OFFICE.

NATHAN C. LANE, OF PHILADELPHIA, PENNSYLVANIA.

PIPE-COUPLING.

1,062,015. Specification of Letters Patent. Patented May 20, 1913.

Application filed June 18, 1912. Serial No. 704,453.

*To all whom it may concern:*

Be it known that I, NATHAN C. LANE, a citizen of the United States, residing at Philadelphia, in the county of Philadelphia and State of Pennsylvania, have invented certain new and useful Improvements in Pipe-Couplings, of which the following is a specification.

This invention relates to pipe couplings, designed more particularly for the purpose of making a firm and tight connection in pipes where they are required to pass through walls, floors, ceilings, partitions or roofs, and one of the principal objects of the invention is to provide reliable and efficient means for uniting the meeting ends of pipes without the use of gaskets, packing or other extraneous accessories which would be liable to decay or disintegrate while in use and render the joint defective.

Another object of the invention is to provide a pipe connection in which the two threaded clamping collars or nuts for uniting the pipe sections are each provided with an annular biting edge to engage the opposite sides of the wall or floor with sufficient stress to insure a tight joint, and this result may be accomplished when the wall, floor or roof is of metal or other material.

Still another object of the invention is to provide a practically water tight union for pipes without the use of gaskets, packing or solder.

These and other objects may be attained by means of the construction illustrated in the accompanying drawing in which—

Figure 1. is a side elevation of a pipe connection made in accordance with my invention. Fig. 2. is a view showing the pipe sections in elevation and the two clamping collars or coupling members in section. Fig. 3. is a perspective view of one of the clamping collars.

Referring to the drawings, the numeral 1 designates the intermediate pipe section which is of the required length to pass through a wall, floor, ceiling or roof, 2, of any thickness, and to project beyond the opposite surfaces thereof. The ends of the section 1 are exteriorly screw threaded, as at 3.

The clamping collars, which are exact duplicates, one of the other, are each provided with a flaring member 4, having an interior recess 5, and a ground annular bearing edge 6, and projecting from the member 4 is an integral nut provided with a wrench-engaging surface 7 and provided with interior screw threads 8 and 9, separated by a plain unthreaded portion 10. A flange 11 projects from the threaded bore of the nut into the recess 5.

The sections 12 of the pipe are provided with exterior screw threads 13 to fit the threads 9 of the nut.

The parts of the coupling are assembled by first passing the pipe section 1 through the wall, floor or roof, and it will be obvious that this pipe section may vary in length to conform to the thickness of the wall, floor, or roof. The clamping collar is turned on the threaded end of the section 1 until the biting edge 6 intimately engages the surface of the wall. The other collar is engaged with the opposite end of the section 1, and turned on with a wrench until the two biting edges 6 engage the opposite surfaces of the wall with such stress as to insure a tight joint. The sections 12 are then turned into the nuts to engage the threads 9. The plain unthreaded portion 10 permits the independent connection of the two collars. One collar may be connected up on one side of the wall, and the other collar turned on to the section 1 afterward, this facilitating the labor of making the connection.

From the foregoing it will be obvious that when the surfaces of the wall, floor or roof are comparatively rough or uneven, the biting edges 6 may be clamped so firmly against the surfaces as to insure a tight joint. If the surfaces be of metal the edges 6 will become firmly and intimately united by rust, and where the surfaces are painted the edges 6 will embed sufficiently in the painted surface to form a very efficient union.

My coupling is comparatively inexpensive to manufacture, can be quickly assembled will hold the pipes firmly in place, and will not require attention after installation, owing to the fact that there are no gaskets to be renewed. The clamping members may also be utilized for uniting truss rods and braces in various kinds of metal structures. One of the members may be used as a water shed for the upper end of a vent pipe and a single member may be utilized by bending the tin roofing around the pipe hole upward within the recess 5 to provide a water shed.

I claim:—

A coupling comprising an intermediate pipe section provided with threaded ends and a plain unthreaded central portion, said pipe section adapted to pass through a wall or floor, a coupling member connected to each end of said pipe section, said coupling members each having an interiorly recessed flaring portion provided with an annular biting edge to intimately engage the opposite surfaces of the wall or floor, said coupling members being interiorly screw threaded to engage the opposite ends of said pipe section and to engage the ends of pipes coöperating with said pipe section, and a wrench engaging portion integral with the coupling members.

In testimony whereof I affix my signature in presence of two witnesses.

NATHAN C. LANE.

Witnesses:
H. L. BRIGHT,
B. M. PRENDERGAST.

---

Copies of this patent may be obtained for five cents each, by addressing the "Commissioner of Patents, Washington, D. C."